UNITED STATES PATENT OFFICE.

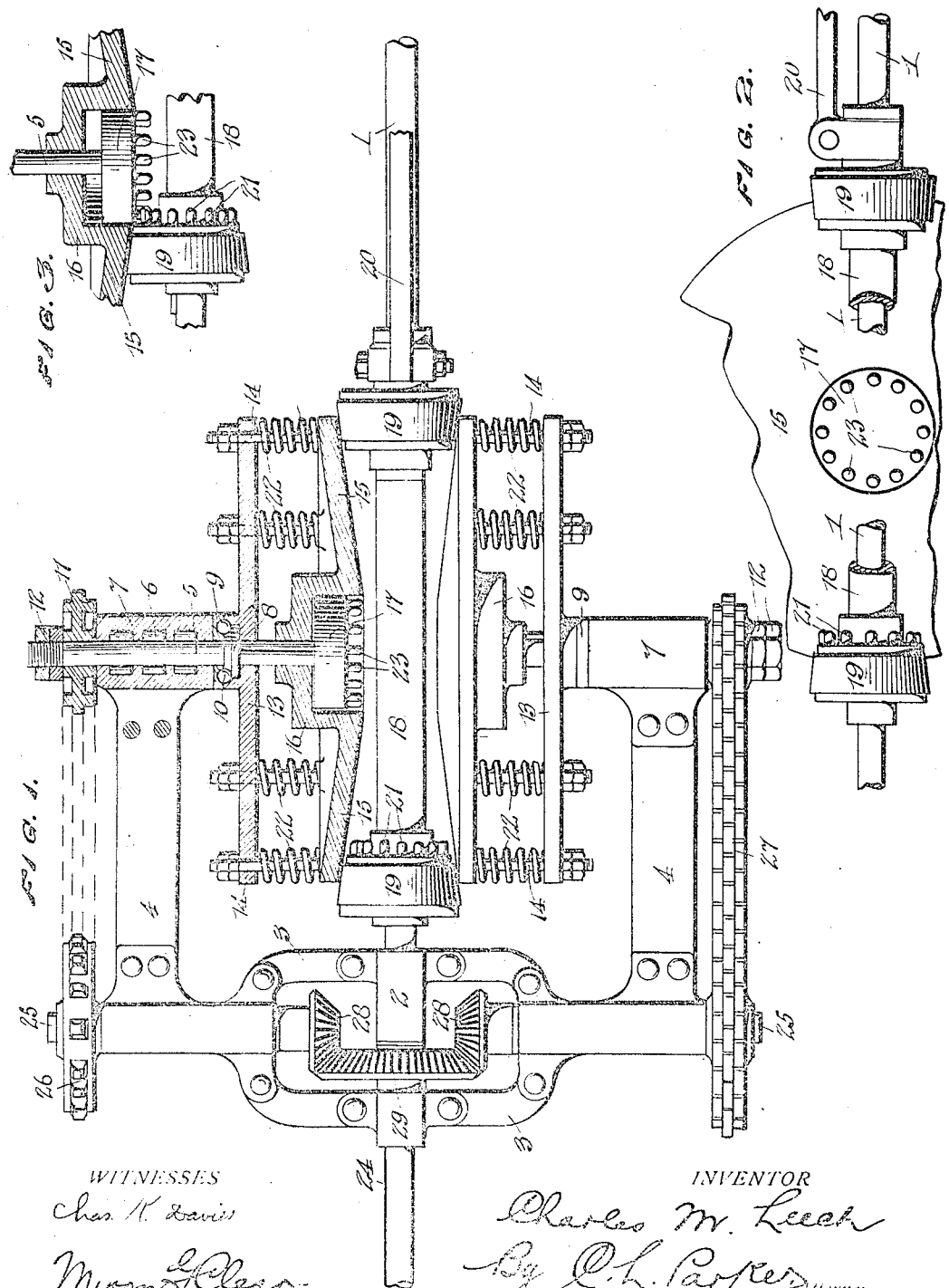

CHARLES M. LEECH, OF LIMA, OHIO.

FRICTION TRANSMISSION-GEARING.

No. 910,136.  Specification of Letters Patent.  Patented Jan. 19, 1909.

Application filed May 12, 1908. Serial No. 432,363.

*To all whom it may concern:*

Be it known that I, CHARLES M. LEECH, citizen of the United States, residing at Lima, in the county of Allen and State of Ohio, have invented certain new and useful Improvements in Friction Transmission-Gearing, of which the following is a specification.

My invention relates to transmission gearing embodying adjustable friction members and adapted for special use in connection with automobiles, and the object thereof is to provide a simple and inexpensive mechanism in which the clutch of the friction parts will be more positive and less liable of disruption.

Further objects and advantages will appear in the course of the following description, in which reference is made to the accompanying drawings forming a part of this specification, in which like numerals are used to designate like parts throughout the several figures, and in which, Figure 1 is a plan view of my improved transmission gear, partly in section. Fig. 2 is a detail elevation of one of the friction disks, and the friction wheels associated therewith, and partly broken away, and Fig. 3 is a detail view partly in horizontal section and partly in plan, of the interlocking high speed connection.

In the practical embodiment of my invention, I provide a transmission gearing comprising a driving shaft 1, having connection at its forward end with the engine, and having its rear end journaled through a bearing 2, in the central longitudinal frame 3, of a U-shaped supporting frame 4, having short shafts 5 journaled in roller bearings 6 through its extensions 7. The shafts 5 are thus mounted at right angles to the driving shaft 1, and are prevented from longitudinal movement through their said bearings by integral collars 8, forming between the same and loose collars 9, ball recesses for the reception of ball bearings 10, upon the interior end of the said extensions 7, and provided with sprocket wheels 11, and lock nuts 12 upon the exterior end thereof. The shafts 5 being held from longitudinal movement, are provided with circular plates 13 mounted thereon about said integral collar 8 thereof, said plate 13 having a plurality of transverse openings extending therethrough, and extending therearound, parallel with and at a short distance from, its peripheral edge, said opening being equidistantly, spaced for the reception of a circular series of bolts 14, extending from the conical frictional disks 15. The friction disks 15 are also mounted upon the short shafts 5, being splined thereon, and are provided with central tubular extensions 16 extending around the said shafts 5 and providing a central cavity upon their working faces, opposing one another upon opposite sides of the driving shaft 1, which cavities are adapted to receive the enlarged circular heads 17, upon the inner end of said shafts.

Splined upon the driving shaft 1, is a sleeve 18, having beveled friction wheels 19, secured thereon, adjacent either end thereof, said friction wheels being adapted to be moved, by means of the slidable sleeve 18, and its operating rod 20 connected thereto, to engage a selected one thereof, between the opposing friction disks 15 and against the faces thereof, thereby rotating the short shafts 5 in opposite directions. It will be understood that one of the friction wheels 19, constitutes the forward drive wheel and the other, the reverse drive wheel, said wheels being spaced apart in order that they may so center upon the driving shaft 1, as shown in Figs. 1 and 2, that they will both escape engagement with the friction disks 15.

The forward drive wheel 19, is provided with a plurality of equidistantly spaced pins 21, projecting from its circular face parallel with the sleeve 18, and in a circular series concentric therewith, and said wheel 19 as the same is moved across the face of the conical friction disks 15 to heighten the speed of rotation of the shafts 5, will cause rearward sliding movement of said friction disks upon their said shafts. In order that the rearward movement of the friction disks 15 as just described, may be uniform, and in order that the same may be held in close engagement with the said wheel 19 at all times, I provide coil springs 22 surrounding the bolts 14, between the said friction disks and their bearing plates 13. In order to prevent the slipping of the friction wheel 19, at high speed, I provide the enlarged head 17 of the shafts 5, with a plurality of forwardly projecting pins 23, equidistantly spaced in a circular series concentric with said shafts, and adapted for engagement with the pins 21 of the forward drive wheel 19 when the same is adjacent the center of the friction disks 15, and in its high speed position, as shown in Fig. 3.

While it is intended that the enlarged head 17 of the shafts 5 shall at normal speed, remain wholly within the cavity in the friction disks 15, formed by their tubular central extensions 16, yet it is evident that when the said friction disks are moved rearwardly upon their shafts 5, the said enlarged head 17 will be exposed, and the pins 23 thereof, and the pins 21 of the drive wheel may readily engage and interlock with one another to prevent said driving wheel from slipping.

Any suitable mechanism for transferring the power from the short shafts 5 to the driven shaft 24, may be employed. The mechanism herein shown, comprises a pair of short shafts 25 journaled through bearings in the U-shaped frame 4, and having their inner ends extending within the rectangular frame 3 at right angles to the driving shaft 1 and the driven shaft 24 alined therewith. Upon their outer ends, the shafts 25 are provided with sprocket wheels 26, connected by sprocket chains 27, with the sprocket wheels 11 of the short shafts 5, while upon their inner end, the said shafts 24 are provided with beveled gears 28 meshing with an enlarged beveled gear 29 secured upon the driven shaft 24.

Having fully described my invention, I claim:

1. In a transmission gearing of the character described, the combination of the driving and driven shafts, shafts mounted at right angles to said driving shaft, conical friction disks splined upon said shafts and provided with central rearwardly extending tubular portions forming central cavities in their working faces, said shafts having enlarged heads, means for pressing said disks toward said enlarged heads to maintain the same entirely within said cavities, and beveled friction wheels splined upon said driving shaft to engage said disks, and adapted for movement across the faces thereof to move the same rearwardly and expose said enlarged heads, engageable series of projecting pins carried by said friction wheels and said enlarged heads, and connections between said disk shafts and said driven shaft for driving the latter, substantially as described.

2. In a transmission gearing of the character described, the combination of the driving and driven shafts, shafts mounted at right angles to said driving shaft, conical friction disks splined upon said shafts and provided with rearwardly projecting bolts extending therefrom, in a circular series adjacent the peripheral edge thereof, bearing plates mounted upon said shafts, immovable with relation thereto and provided with openings therethrough for the reception of said bolts loosely therein, springs surrounding said bolts between said disks and said bearing plates, beveled friction wheels splined upon said driving shaft to engage said disks, and connections between said disk shafts and said driven shaft for driving the latter, substantially as described.

In testimony whereof I affix my signature in presence of two witnesses.

CHARLES M. LEECH.

Witnesses:
W. J. RICHIE,
CLARENCE C. MILLER.